US009953464B2

(12) United States Patent
Darst et al.

(10) Patent No.: US 9,953,464 B2
(45) Date of Patent: Apr. 24, 2018

(54) PORTABLE OCCUPANCY DETECTION METHODS, SYSTEMS AND PROCESSOR-READABLE MEDIA

(71) Applicant: Xerox Corporation, Norwalk, CT (US)

(72) Inventors: Matthew T. Darst, Chicago, IL (US); David P. Cummins, Washington, DC (US); Yao Rong Wang, Webster, NY (US); Kenneth J. Mihalyov, Webster, NY (US); Johannes M. Frings, Roswell, GA (US); Vincent Ronald Chastain, Buford, GA (US)

(73) Assignee: Conduent Business Services, LLC, Dallas, TX (US)

( * ) Notice: Subject to any disclaimer, the term of this patent is extended or adjusted under 35 U.S.C. 154(b) by 750 days.

(21) Appl. No.: 14/037,490

(22) Filed: Sep. 26, 2013

(65) Prior Publication Data

US 2015/0085129 A1    Mar. 26, 2015

(51) Int. Cl.
    *G07B 15/02*    (2011.01)
    *G06K 9/00*     (2006.01)
(52) U.S. Cl.
    CPC ......... *G07B 15/02* (2013.01); *G06K 9/00771* (2013.01)
(58) Field of Classification Search
    CPC ............... G07B 15/02; G06K 9/00771; G06K 9/00812; G07F 17/246
    See application file for complete search history.

(56) References Cited

U.S. PATENT DOCUMENTS 6,285,297 B1    9/2001    Ball
6,384,741 B1 *  5/2002    O'Leary, Sr. ............. B60R 1/00
                                                    340/905
7,049,979 B2    5/2006    Dunning
7,059,783 B1 *  6/2006    Wesselink ............... G03B 17/00
                                                    348/143
7,104,447 B1 *  9/2006    Lopez .................. G06Q 20/206
                                                    235/381
7,111,997 B2    9/2006    Wesselink et al.
7,116,246 B2   10/2006    Winter et al.
7,349,025 B2    3/2008    Wong
7,697,034 B2    4/2010    Shimizu
(Continued)

FOREIGN PATENT DOCUMENTS

EP    0 556 956 B1    5/2002

OTHER PUBLICATIONS

Fybr— Better Communities Through Better Parking, printed Sep. 24, 2013, 3 pages, http://streetsmarttechnology.com.

*Primary Examiner* — Obafemi Sosanya
(74) *Attorney, Agent, or Firm* — Kermit D. Lopez; Luis M. Ortiz; Ortiz & Lopez, PLLC

(57) ABSTRACT

Methods, systems and processor-readable media for portable parking occupancy detection. One or more cameras can be provided on a portable mast for capturing video on parking of a street. Optional attachments to the portable mast can include stabilization base and/or a set of guy ropes for further stabilizing the mast. A power unit can be utilized for delivering power to the system. A video capturing/processing unit either captures and records the video from the camera(s) for offline processing of parking occupancy or processes the videos on-site. Optionally, a wireless communication unit for transmitting either video or processed parking occupancy data to a central location can be employed.

20 Claims, 7 Drawing Sheets

(56) References Cited

U.S. PATENT DOCUMENTS

| | | | | |
|---|---|---|---|---|
| 8,625,853 B2* | 1/2014 | Carbonell | ........... | G06K 9/00785 |
| | | | | 382/104 |
| 2005/0068198 A1* | 3/2005 | Brega | ..................... | G01S 17/89 |
| | | | | 340/933 |
| 2006/0250278 A1* | 11/2006 | Tillotson | ................... | G08G 1/14 |
| | | | | 340/932.2 |
| 2010/0166411 A1 | 7/2010 | Gladstone et al. | | |
| 2011/0196581 A1* | 8/2011 | Zurfluh | ................... | H01Q 1/10 |
| | | | | 701/49 |
| 2012/0092190 A1* | 4/2012 | Stefik | ..................... | G06Q 10/02 |
| | | | | 340/932.2 |
| 2012/0095790 A1 | 4/2012 | Stefik et al. | | |
| 2012/0095791 A1 | 4/2012 | Stefik et al. | | |
| 2012/0095792 A1 | 4/2012 | Stefik et al. | | |
| 2012/0095812 A1 | 4/2012 | Stefik et al. | | |
| 2012/0151853 A1* | 6/2012 | Thoren | ................. | E04H 12/182 |
| | | | | 52/111 |

\* cited by examiner

PORTABLE OCCUPANCY DETECTION METHODS, SYSTEMS AND PROCESSOR-READABLE MEDIA

FIELD OF THE INVENTION

Embodiments are generally related to the field of parking management and transportation systems. Embodiments are also related to parking occupancy detection techniques, devices, and systems.

BACKGROUND

A balance between supply and demand must be determined to meet the parking requirements of motorists. The ability to efficiently allocate and manage on-street parking remains elusive, even when parking requirements are significant, recurring, and known ahead of time. For instance, urban parking spaces characteristically undergo periods of widely skewed demand and utilization, with low demand and light use in some periods, often during the night, and heavy demand and use at other times. Real-time parking occupancy detection systems are an emerging technology in parking management.

Some prior art parking occupancy detection approaches utilize a puck-style sensor configuration that outputs a binary signal when detecting a vehicle in, for example, a parking stall or a particular parking spot. FIG. 1, for example, illustrates respective parking occupancy detection systems 100 for parking occupancy detection in an on-street parking. In the example depicted in FIG. 1, system 100 includes one or more puck-style in-ground sensors 102, 104, 106. Also depicted in FIG. 1 are example parking spaces 110, 108, 112, 114. A vehicle 116 is shown parked in parking space 108 in FIG. 1. The vehicle 116 can be detected by a sensor similar to 102, 104, and 106 located in parking space 108 underneath the vehicle 116. In the example shown in FIG. 1, the sensors 102, 104, and 106 can provide real-time parking occupancy data Video-based parking occupancy detection systems, an example of which is shown in FIG. 2, are a recently developed technology. The video-based parking occupancy detection system shown in FIG. 2, for example, generally includes an image-capturing unit 152 (e.g., a video camera) mounted on, for example, a pole 151. The image-capturing unit 152 monitors within its field of view one or more vehicles 154, 156, 158 respectively parked in parking spaces 160, 162, 164.

On-street parking occupancy data has many applications. In one example, parking occupancy data can aid drivers searching for the parking spots so that traffic congestion in cities due to drivers circling about parking lots in a wasteful and time consuming effort to find parking spots can be reduced. In another example, on-street/curbside parking space reservation systems have been proposed based on inputs from parking occupancy data. In yet another example, parking occupancy data can aid law enforcement agencies to locate parking violations when parking occupancy data is compared with parking meter payment data. In general, parking occupancy data obtained from parking occupancy detection systems is the base for parking space management and reservation systems.

The prior arts of parking occupancy data detection system, including the puck-style in-ground sensor in FIG. 1 and the video based parking occupancy detection system shown in FIG. 2 are not portable. The camera 152 for capturing video is typically installed on a fixed utility pole 151. Power has to be accessible on the street for the camera 152 and other components of the system. There are many situations where a portable solution is preferred. One example is that not all streets include utility poles, or if they do, power may not be accessible. Another example is the situation where parking occupancy can be processed offline to infer parking occupancy patterns over a day, a week or months. Under this circumstance, a portable solution is much more economical compared with the fixed camera solution as the portable solution can be rotated to use from street to street.

FIG. 3 illustrates an ultrasonic parking sensor system that includes one or more ultrasonic sensors 176, 178, 180 deployed, for example, in a ceiling of a parking garage with respect to parking spaces 171, 173, 175 in which respective vehicles 170, 172, and 174 are parked. Again, such a solution is not portable.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved parking management methods and systems.

It is another aspect of the disclosed embodiments to provide for an improved transportation/video based parking occupancy detection method and system.

It is yet another aspect of the disclosed embodiments to provide for a portable parking occupancy detection method and system.

The aforementioned aspects and other objectives and advantages can now be achieved as described herein. Methods and systems for street location parking prediction are disclosed. In general, a first street location can be identified where real-time parking occupancy data is not available, the first street location including one or more parking spaces and at least one parking meter enabled to record financial transactions associated with parking on the first street location. The operation of a portable parking occupancy detection unit can be enabled at the first street location and, for a period of time, record video of the one or more parking spaces at the first street location to identify its parking occupancy data. A second street location can be identified where real-time parking occupancy data is not available, the second street location including one or more parking spaces and at least one parking meter enabled to record financial transactions associated with parking on the first street location.

The operation of a portable parking occupancy detection unit can also be enabled at the second street location and, for a period of time, record video of the one or more parking spaces at the second street location to identify its parking occupancy data. Parking meter transaction data can be obtained corresponding to each parking meter at the first and second street locations. The parking occupancy data and the parking meter transaction data for each respective street location can then be correlated. Then, in response to a request for parking occupancy information for at least one of the first street location and the second street location, an indication of at least one of a parking space status and a parking violation status can be provided.

The portable parking occupancy detection unit at the first street location and/or the second street location generally can include a telescopic mast; at least one camera on the telescopic mast; a stabilization base for the telescopic mast; a power generating device; and a video recording device. The parking occupancy detection unit can determine the number of parking vehicles and the number of available parking spaces of the street block at a given time, the street block including the first street location and/or the second street location.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
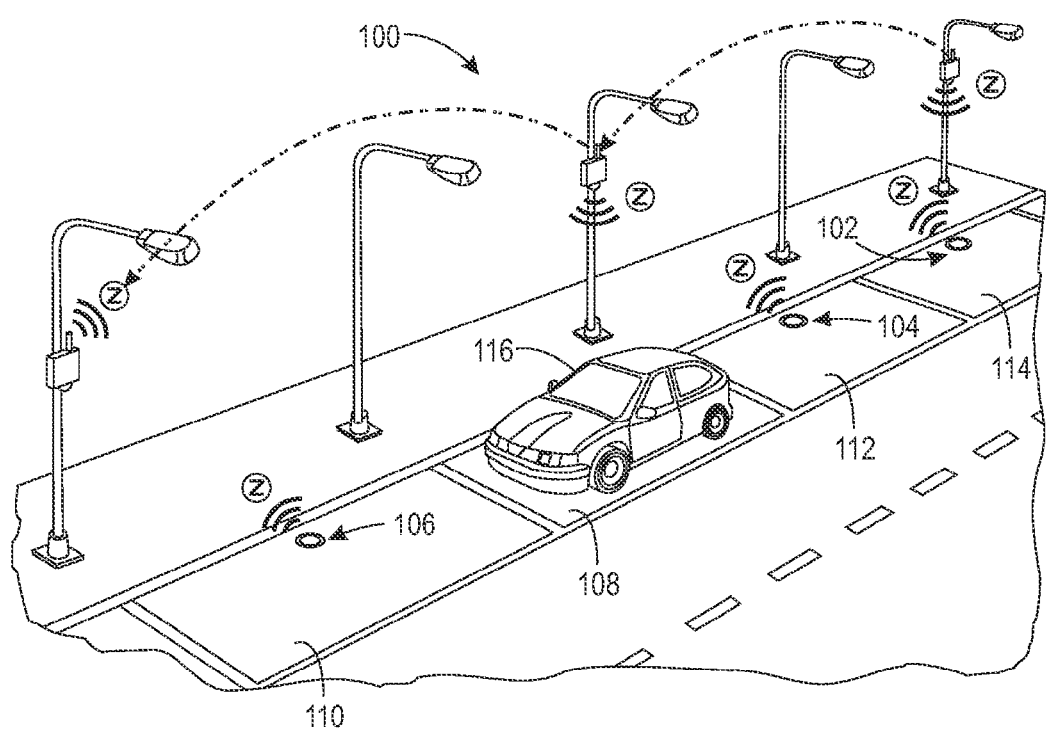
FIG. 1 illustrates a prior art parking occupancy detection system based on a puck-style sensor.
Figure 2:
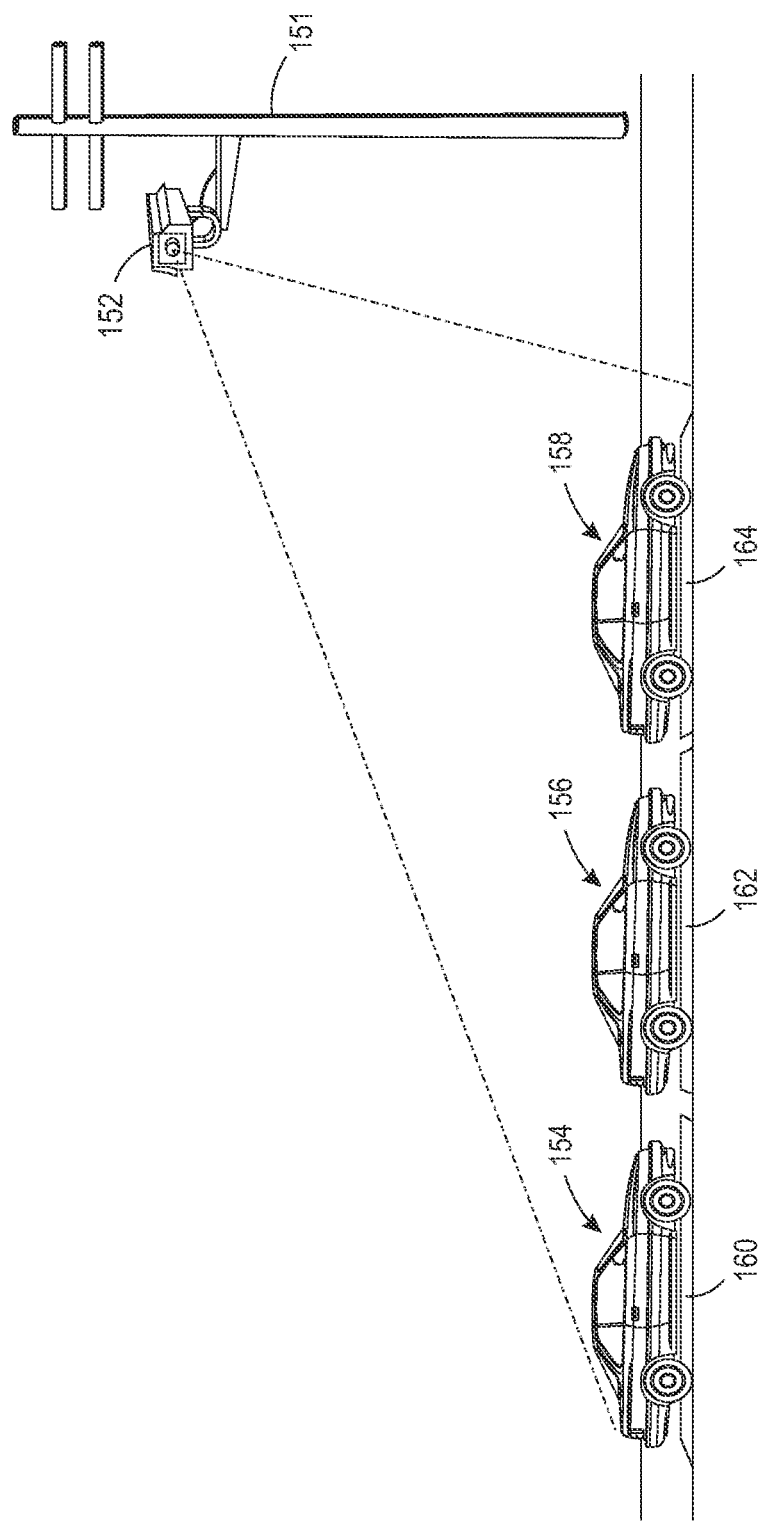
FIG. 2 illustrates a prior art video-based parking occupancy detection system with an image capturing unit.
Figure 3:
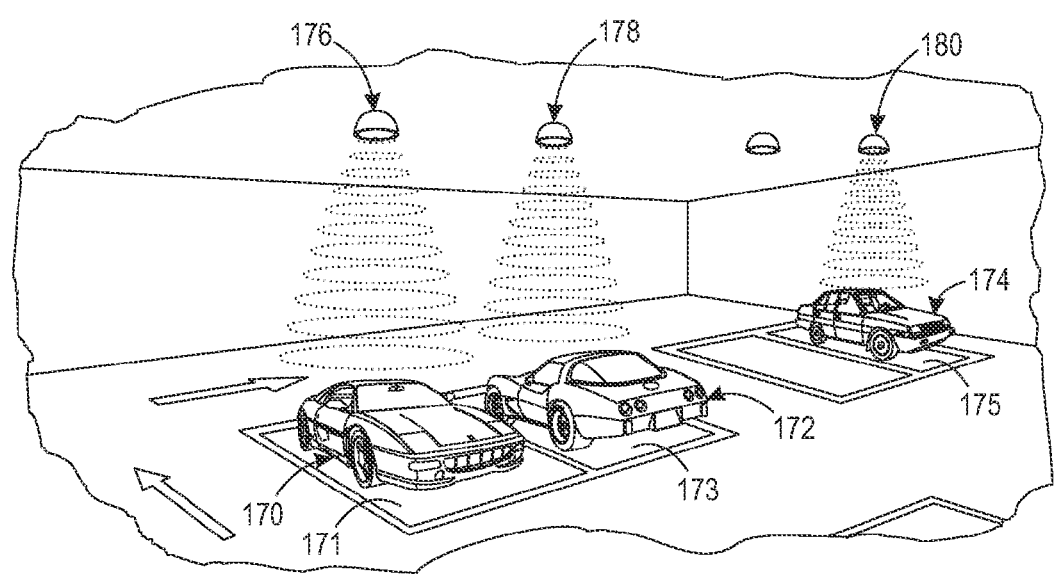
FIG. 3 illustrates a prior art ultrasonic parking sensor system.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed embodiments can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., JAVA, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, WiMax, 802.11x, and cellular network or the connection can be made to an external computer via most third party supported networks (e.g. through the Internet via an internet service provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

Figure 4:
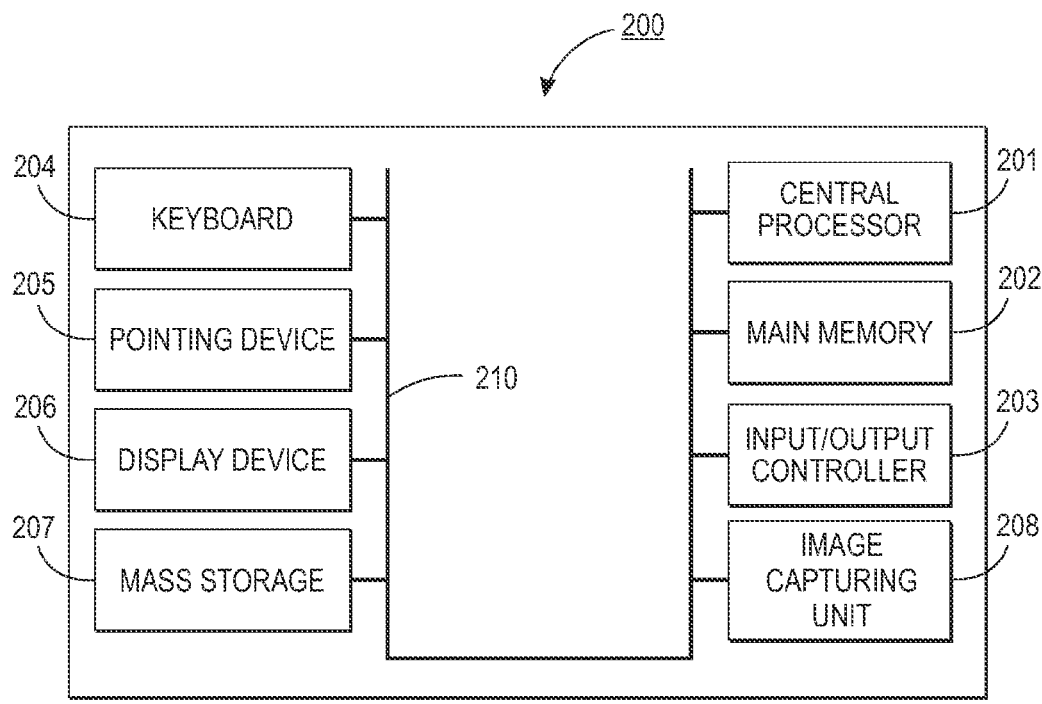
FIG. 4 illustrates a schematic view of a computer system, in accordance with the disclosed embodiments.
Figure 5:
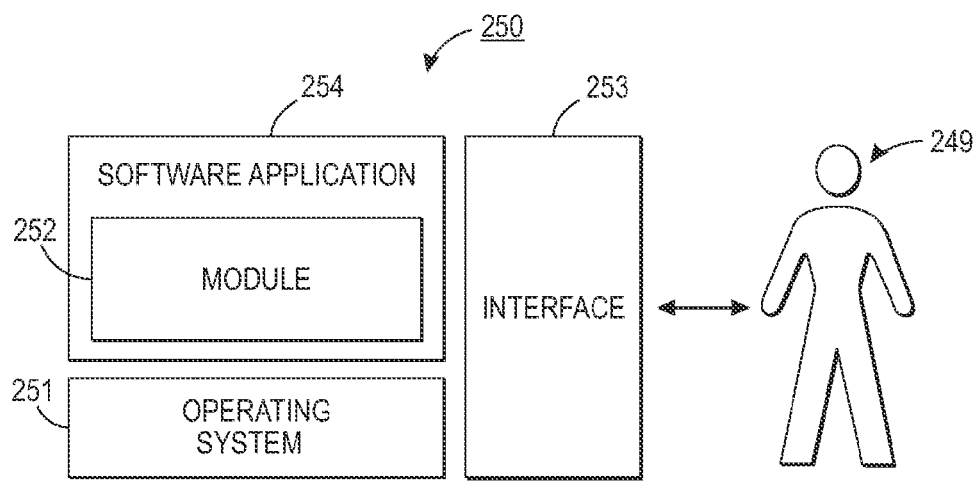
FIG. 5 illustrates a schematic view of a software system including a video-based parking space detection and reservation module, an operating system, and a user interface, in accordance with the disclosed embodiments.

FIGS. 4-5 are provided as exemplary diagrams of data-processing environments in which embodiments of the present invention may be implemented. It should be appreciated that FIGS. 4-5 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 4, an embodiment may be implemented in the context of a data-processing system 200 that includes, for example, a central processor 201, a main memory 202, an input/output controller 203, a keyboard 204, an input device 205 (e.g., a pointing device such as a mouse, track ball, pen device, etc.), a display device 206, a mass storage 207 (e.g., a hard disk), an image capturing unit 208, and in some cases, a USB (universal serial bus) peripheral connection (not shown in FIG. 4). As illustrated, the various components of data-processing system 200 can communicate electronically through a system bus 210 or similar architecture. The system bus 210 may be, for example, a subsystem that transfers data between, for example, computer components within data-processing system 200 or to and from other data-processing devices, components, computers, etc. Data-processing system 200 may be, for example, a desktop computer, a wireless communications device (e.g., Smartphone), table computing device, a server, etc.

FIG. 5 illustrates a computer software system 250 for directing the operation of the data-processing system 200 depicted in FIG. 4. Software application 254, stored in main memory 202 and on mass storage 207, generally includes a kernel or operating system 251 and a shell or interface 253. One or more application programs, such as software application 254, may be "loaded" (i.e., transferred from mass storage 207 into the main memory 202) for execution by the data-processing system 200. The data-processing system 200 receives user commands and data through user interface 253. These inputs may then be acted upon by the data-processing system 200 in accordance with instructions from operating system 251 and/or software application 254. The software application 254 can provide instructions via, for example, module 252 for performing the steps or logical operations of, for example, the methods 321, 400 respectively shown FIG. 7-8.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc. In one embodiment, module 252 can store and implement, for example, the instructions or steps shown in FIG. 6.

The interface 253, which is preferably a graphical user interface (GUI), can serve to display results, whereupon a user may supply additional inputs or terminate a particular session. In some embodiments, operating system 251 and interface 253 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 251 and interface 253.

FIGS. 4-5 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms, including Macintosh, Unix, Linux, and the like.

Figure 6:
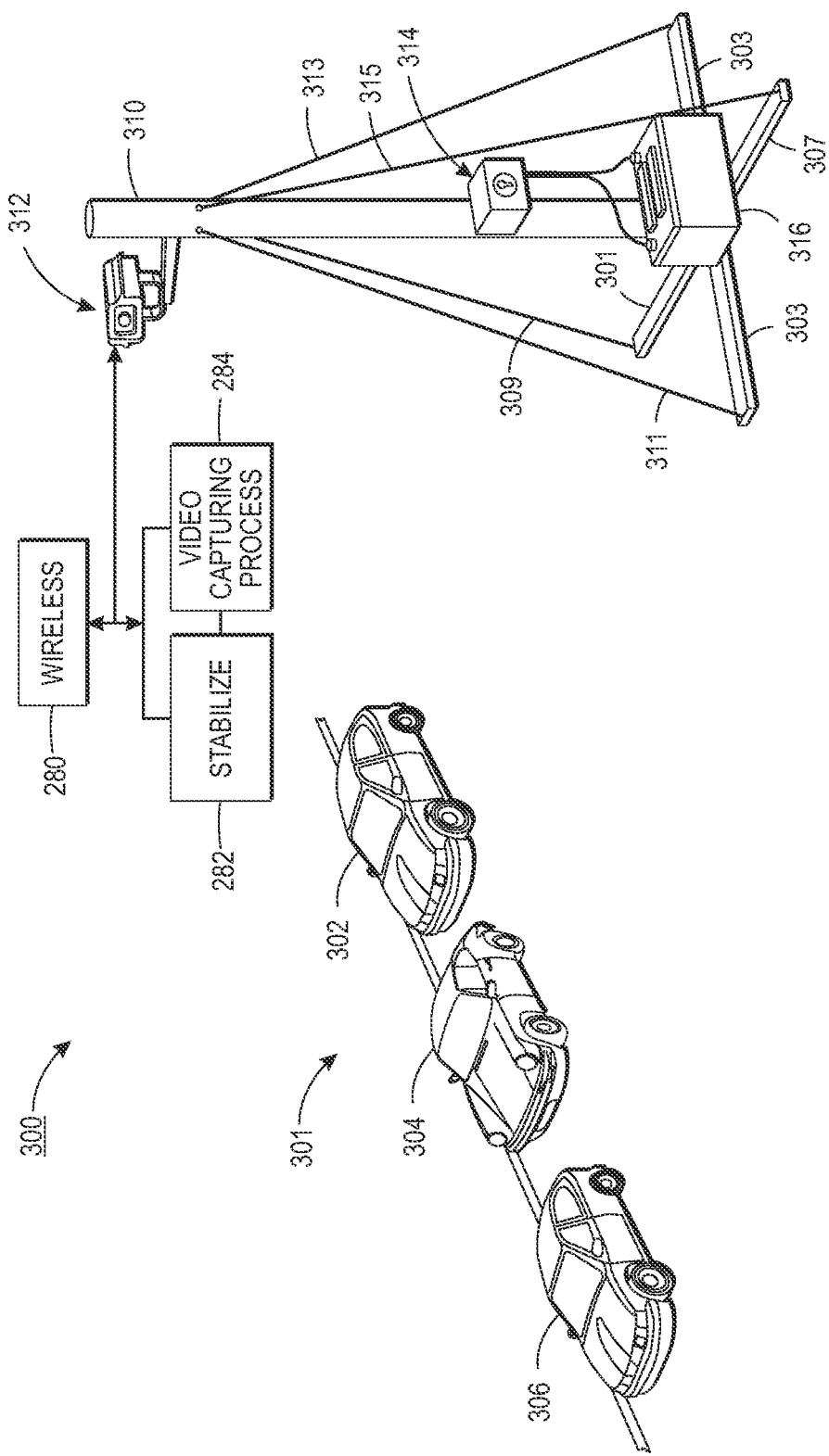
FIG. 6 illustrates a schematic diagram of a portable parking occupancy detection system, which can be implemented in accordance with a preferred embodiment.

FIG. 6 illustrates a schematic diagram of a portable parking occupancy detection system 300, which can be implemented in accordance with a preferred embodiment. In the particular embodiment shown in FIG. 6, one or more cameras such as, for example, camera 312 can be provided for capturing video of a street parking area 301 wherein one or more vehicles such as vehicles 302, 304, 306, etc., may be parked. A portable mast 310 can be provided upon which camera 312 is positioned. The portable mast 310 is preferably high enough for the camera 312 to view the street parking area 301 clearly, typically above 20 ft. The mast may comprise additional elements so that it can be lowered and folded for easy portability. Optional attachments to the portable mast 310 can include the use of a stabilization base composed of, for example, base components 301, 303, 307 and/or a set of guy ropes 309, 311, 313, 315 for further stabilizing the mast 310. The stabilization base can be configured in some cases as a set of heavy materials anchored on the ground, or could be implemented in the context of a trailer for combining stabilization with easy moving capabilities.

A power unit 316 can also be provided for delivering power to the system 300. The power unit 316 maybe be configured as, for example, a set of batteries that may be charged by, e.g., solar panels. The power unit 316 may also be used for stabilizing the mast 310. A video capturing/processing unit 284 can also be provided, which communicates with the camera 312 and assists in either capturing and recording the video from the camera(s) 312 for offline processing of parking occupancy or processes the videos on-site for parking occupancy detection. In addition to the parking occupancy detection video analytics for the fixed camera solution, an image stabilization module 282 may be added as the video captured by the portable solution is likely to have camera shaking or swaying. Optionally, a wireless communication unit 280 is used for transmitting either video or processed parking occupancy data to a central location.

Figure 7:
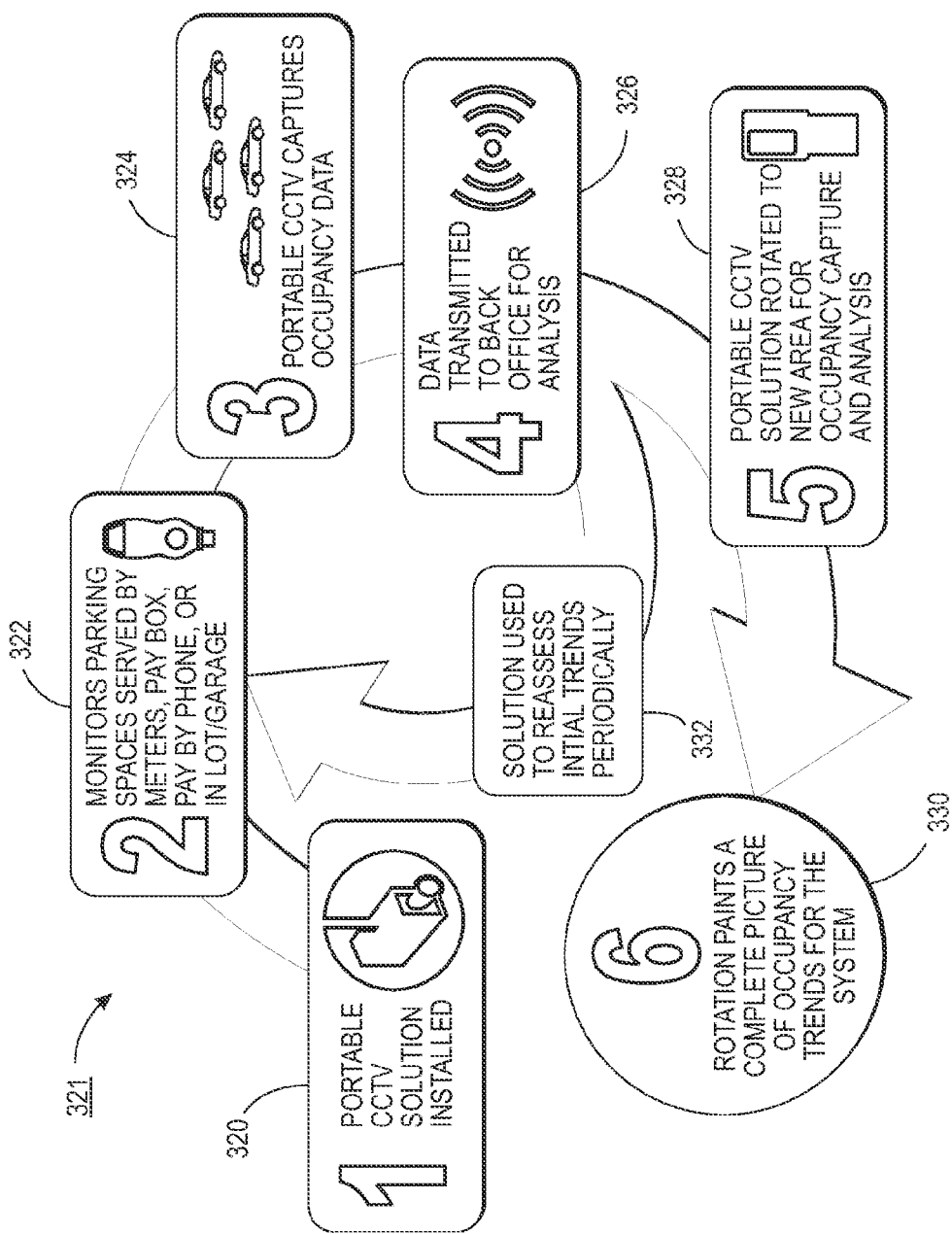
FIG. 7 illustrates a flow diagram of a method for utilizing the portable parking occupancy detection system shown in FIG. 6, in accordance with a preferred embodiment.

FIG. 7 illustrates a flow diagram of a method 321 for utilizing the portable parking occupancy detection system 300 shown in FIG. 6, in accordance with a preferred embodiment. In general, as shown at block 320, a portable CCTV (Closed Circuit Television) system or unit can be installed. The video camera 312 shown in FIG. 6, for example, along with modules 280, 282, 284 (which may be, for example, software modules) may be installed atop or along the mast 310. Such a video camera 312 can be configured in the context of a CCTV system. Next, as shown at block 322, the CCTV system can be utilized to monitor parking spaces in a particular parking area served by, for example, parking meters, a pay box, pay-by-phone systems, or other systems in, for example, a lot/garage type parking area.

Thereafter, as depicted at block 324, the portable CCTV (e.g., system 300 of FIG. 6) can capture occupancy data. Then, as shown at block 326, such data (along with other appropriate data) can be transmitted back to a central location or office for analysis. Two paths can then occur after the operation shown at block 326 is completed. The solution can be used to reassess initial trends periodically as shown at block 332 or the portable CCTV solution (e.g., system 300 shown in FIG. 6) can be rotated to a new area for occupancy capture and analysis. Following completion of the operation shown at block 328, rotation data can be utilized to "paint" a complete picture of occupancy trends for the overall system, as shown at block 330. Following processing of the operation illustrated at block 332, the operation shown at block 322 can be repeated and so forth.

FIG. 7 thus illustrates an example scenario involving use of the occupancy detection system 300. In general, data can be captured over a prescribed period of time on, for example, a block face. Analysis of the data can be performed to determine daily, weekly or monthly patterns. Such data can be employed to predict occupancy. The camera solution is allowed to be rotated to new blocks for data capture and analysis. Additionally, confirmation of trends can occur on a regular basis so that predictions can be modified in light of seasonality, policy modifications (e.g., rate, day, hour, and time limit changes), modifications to demand (demand generators, modifications to supply), or other modifications.

Figure 8:
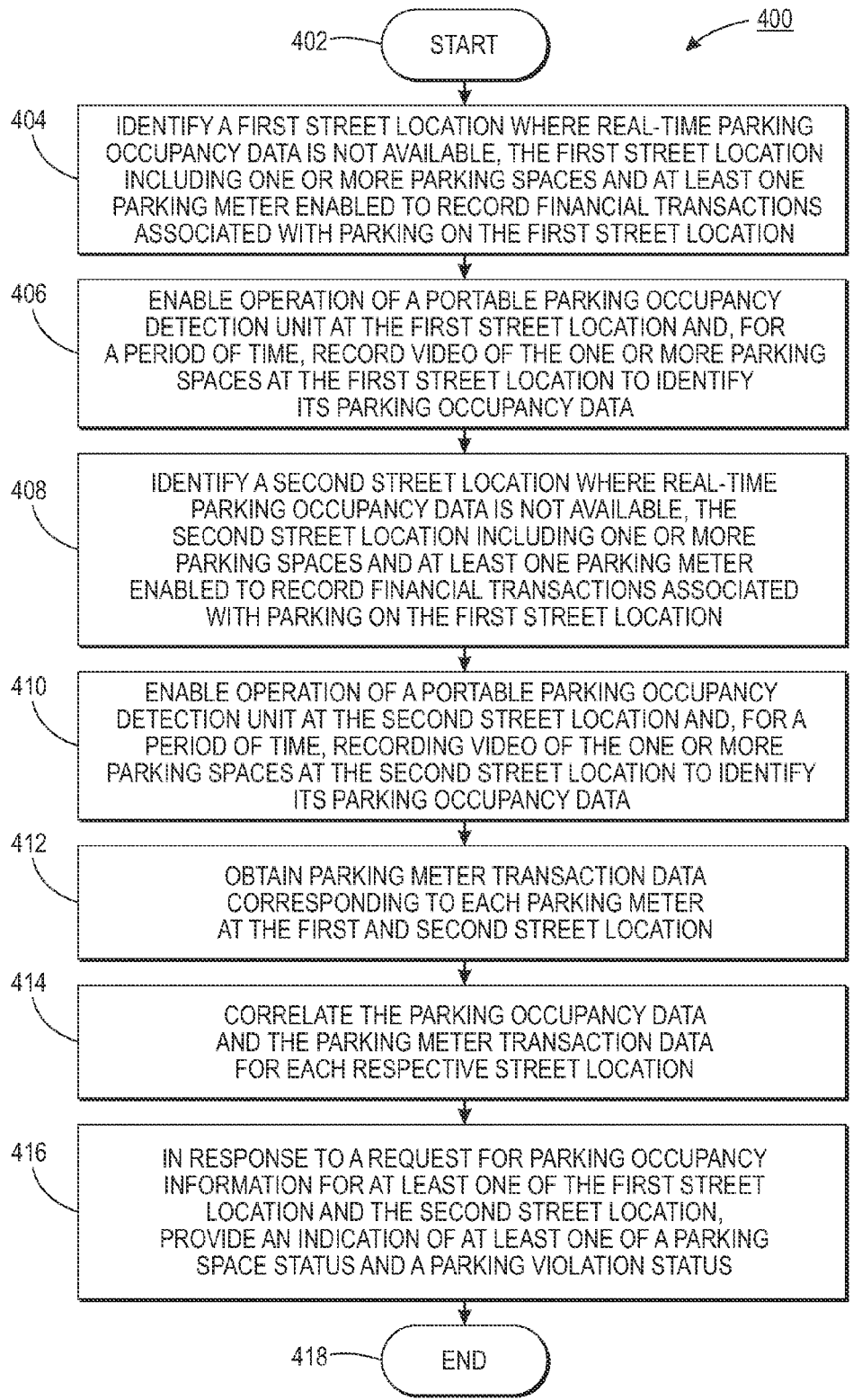
FIG. 8 illustrates a high level flow chart of operations illustrating logical operational steps of a method for parking occupancy detection, in accordance with another embodiment.

FIG. 8 illustrates high level flow chart of operations illustrating logical operational steps of a method 400 for parking occupancy detection, in accordance with an alternative embodiment. Method 400 allows for street location parking prediction. The process can be initiated as shown at block 402. Thereafter, as depicted at block 404, a step or logical operation can be implemented for identifying a first street location where real-time parking occupancy data is not available, the first street location including one or more parking spaces and at least one parking meter enabled to record financial transactions associated with parking on the first street location. As described next at block 406, a step or logical operation can be performed for enabling operation of a portable parking occupancy detection unit at the first street location and, for a period of time, recording video of the one or more parking spaces at the first street location to identify its parking occupancy data.

Then, as shown at block 408, a step or logical operated can be implemented for identifying a second street location where real-time parking occupancy data is not available, the second street location including one or more parking spaces and at least one parking meter enabled to record financial transactions associated with parking on the first street location. Thereafter, as depicted at block 410, a step or logical operation can be performed for enabling operation of a portable parking occupancy detection unit at the second street location and, for a period of time, recording video of the one or more parking spaces at the second street location to identify its parking occupancy data. Next, as illustrated at block 412, a step or logical operation can be implemented for obtaining parking meter transaction data corresponding to each parking meter at the first and second street locations.

Then, as described at block 414, a step or logical operation can be implemented for correlating the parking occupancy data and the parking meter transaction data for each respective street location. Note that in some cases, the parking occupancy data and the parking meter transaction data further can include, for example, data indicative of hourly, daily, weekly, monthly or other trends. Thereafter, as shown at block 416, in response to a request for parking occupancy information for at least one of the first street location and the second street location, a step or logical operation can be performed for providing an indication of at least one of a parking space status and a parking violation status. The process can then terminate, as shown at block 418.

In general, the portable parking occupancy detection unit (e.g., system 300) at the first street location and/or the second street location as discussed above can include a telescopic mast such as mast 310 shown in FIG. 6 along with a stabilization base composed of, for example, stabilization components 301, 303, 307 and 309, 311, 313, 315 also shown in FIG. 6. The portable parking occupancy detection unit/system 300 can also include a power generating device 316 and a video recording device 312 along with additional modules (software, hardware, etc.) such as the various modules 280, 282, 284 also shown in FIG. 6. The parking occupancy detection unit/system 300 can determine the number of parking vehicles (e.g., vehicles 302, 304, 306, etc., shown in FIG. 6) and a number of available parking spaces of the street block at a given time, the street block including the first street location, and/or the second street location.

Based on the foregoing, it can be appreciated that a number of embodiments, preferred and alternative, are disclosed herein. For example, in one embodiment, a street location parking prediction method can be implemented. Such a method can include the steps or logical operations of identifying a first street location where real-time parking occupancy data is not available, the first street location including one or more parking spaces and at least one parking meter enabled to record financial transactions associated with parking on the first street location; enabling operation of a portable parking occupancy detection unit at the first street location and, for a period of time, recording video of the one or more parking spaces at the first street location to identify its parking occupancy data; identifying a second street location where real-time parking occupancy data is not available, the second street location including one or more parking spaces and at least one parking meter enabled to record financial transactions associated with parking on the first street location; enabling operation of a portable parking occupancy detection unit at the second street location and, for a period of time, recording video of the one or more parking spaces at the second street location to identify its parking occupancy data; obtaining parking meter transaction data corresponding to each parking meter at the first and second street locations; correlating the parking occupancy data and the parking meter transaction data for each respective street location; and in response to a request for parking occupancy information for at least one of the first street location and the second street location, providing an indication of at least one of a parking space status and a parking violation status.

In some embodiments, the portable parking occupancy detection unit at the first street location and/or the second street location can include, for example, a telescopic mast; at least one camera on the telescopic mast; a stabilization base for the telescopic mast; a power generating device; and a video recording device. In some embodiments, the parking occupancy detection unit determines a number of parking vehicles and a number of available parking spaces of the street block at a given time, the street block including the first street location and/or the second street location. In other embodiments, the correlated parking occupancy data and the parking meter transaction data can constitute data indicative of hourly, daily, weekly or monthly parking trends. In yet other embodiments, the parking occupancy detection unit can determine a number of parking vehicles and a number of available parking spaces of the street block at a given time, the street block including the first street location and/or the second street location.

In still another embodiment, a street location parking prediction system can be provided. Such a system can include, for example, a computer-usable medium embodying computer program code, the computer-usable medium capable of communicating with the processor. Such computer program code can include instructions executable by the processor and configured for: identifying a first street location where real-time parking occupancy data is not available, the first street location including one or more parking spaces and at least one parking meter enabled to record financial transactions associated with parking on the first street location; enabling operation of a portable parking occupancy detection unit at the first street location and, for a period of time, recording video of the one or more parking spaces at the first street location to identify its parking occupancy data; identifying a second street location where real-time parking occupancy data is not available, the second street location including one or more parking spaces and at least one parking meter enabled to record financial transactions associated with parking on the first street location; enabling operation of a portable parking occupancy detection unit at the second street location and, for a period of time, recording video of the one or more parking spaces at the second street location to identify its parking occupancy data; obtaining parking meter transaction data corresponding to each parking meter at the first and second street locations; correlating the parking occupancy data and the parking meter transaction data for each respective street location; and in response to a request for parking occupancy information for at least one of the first street location and the second street location, providing an indication of at least one of a parking space status and a parking violation status.

In still another embodiment, a processor-readable medium storing code representing instructions to cause a process for street location parking prediction can be implemented. Such code can include code to, for example, identify a first street location where real-Lime parking occupancy data is not available, the first street location including one or more parking spaces and at least one parking meter enabled to record financial transactions associated with parking on the first street location; enable operation of a portable parking occupancy detection unit at the first street location and, for a period of time, recording video of the one or more parking spaces at the first street location to identify its parking occupancy data; identify a second street location where real-time parking occupancy data is not available, the second street location including one or more parking spaces and at least one parking meter enabled to record financial transactions associated with parking on the first street location; enable operation of a portable parking occupancy detection unit at the second street location and, for a period of time, recording video of the one or more parking spaces at the second street location to identify its parking occupancy data; obtain parking meter transaction data corresponding to each parking meter at the first and second street locations; correlate the parking occupancy data and the parking meter transaction data for each respective street location; and in response to a request for parking occupancy information for at least one of the first street location and the second street location, provide an indication of at least one of a parking space status and a parking violation status.

Note that throughout the discussion herein, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices, assemblies, etc., are also deemed to comprise computing devices having a processor and a non-transitory memory storing instructions executable by the processor that cause the device to control, manage, or otherwise manipulate the features of such assemblies, devices, etc.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

The invention claimed is:

1. A street location parking prediction method, comprising:
   identifying a first street location among a plurality of street locations where real-time parking occupancy data is not available, the first street location including one or more parking spaces and at least one parking meter enabled to record financial transactions associated with parking at the first street location, wherein said plurality of street locations includes adjacent and non-adjacent parking locations;
   enabling operation of a portable parking occupancy detection unit at the first street location and, for a period of time, recording video of the one or more parking spaces at the first street location with a closed circuit recording system associated with the portable parking occupancy detection unit;
   stabilizing images in said recorded video of the one or more parking spaces with an image stabilization module associated with the portable occupancy detection unit;
   identifying parking occupancy data for said period of time associated with the first street location;
   identifying a second street location among said plurality of street locations where real-time parking occupancy data is not available, the second street location including one or more parking spaces and at least one parking meter enabled to record financial transactions associated with parking at the second street location, wherein said plurality of street locations includes adjacent and non-adjacent parking locations;
   enabling operation of the portable parking occupancy detection unit at the second street location and, for a second period of time, recording video of the one or more parking spaces at the second street location;
   stabilizing images in said recorded video of the one or more parking spaces at the second street location with an image stabilization module;

identifying parking occupancy data for said second period of time associated with the second street location;

obtaining parking meter transaction data corresponding to each parking meter at the first and second street locations;

correlating the parking occupancy data and the parking meter transaction data for each respective street location among said plurality of parking locations;

establishing a parking occupancy pattern over at least a week according to said correlation of the parking occupancy data and the parking meter transaction data; and in response to a request for parking occupancy information for at least one of the first street location and the second street location, providing an indication of a parking space status and a parking violation status.

2. The method of claim 1 wherein said portable parking occupancy detection unit at said first street location and/or said second street location comprises:

a telescopic mast, said telescopic mast extending at least 20 feet and configured to be foldable;

at least one camera associated with said closed circuit recording system for acquiring said video, said at least one camera located on said telescopic mast;

a stabilization base for said telescopic mast, said stabilization base comprising a plurality of stabilization components that assist in stabilizing said telescopic mast, said stabilization components comprising a plurality of crossing base components anchored to the ground, and a set of guy ropes;

a power generating device that generates power and is configured on said plurality of stabilization components thereby supporting stabilization of said telescopic mast;

a video capturing/processing unit for said recording of said video acquired by said at least one camera; and a wireless communications unit for transmitting processed said parking occupancy data to a central location, said wireless communications unit associated with said video capturing/processing unit.

3. The method of claim 2 wherein said parking occupancy detection unit determines a number of parking vehicles and a number of available parking spaces of said street block at a given time, said street block including the first street location and the second street location among said plurality of parking locations, said plurality of parking orations including said adjacent and non-adjacent parking locations.

4. The method of claim 3 wherein said correlating the parking occupancy data and the parking meter transaction data further comprises deriving data indicative of monthly parking trends, in response to said correlating said parking occupancy data and said parking meter transaction data.

5. The method of claim 4 wherein said video capturing/processing unit communicates with said at least one camera in capturing and recording said video acquired by said at least one camera for offline processing and on-site processing.

6. The method of claim 3 wherein said correlating the parking occupancy data and the parking meter transaction data for each respective street location, further comprises correlating the parking occupancy data and the parking meter transaction data for each respective street location to derive data indicative of hourly, daily, weekly, and monthly parking trends and wherein said parking trends are confirmed on a regular basis so that parking occupancy predictions are modified of light seasonality, policy modifications and modifications to demand including demand generators and modifications to supply.

7. The method of claim 6 wherein said power generating device comprises a power unit comprising, a set of batteries powered by at least one solar panel.

8. A street location parking prediction system, said system comprising:

at least one processor;

a non-transitory computer-usable medium embodying computer program code, said non-transitory computer-usable medium capable of communicating with said at least one processor, said computer program code comprising instructions executable by said at least one processor and configured for:

identifying a first street location among a plurality of street locations where real-time parking occupancy data is not available, the first street location including one or more parking spaces and at least one parking meter enabled to record financial transactions associated with parking at the first street location, wherein said plurality of street locations includes adjacent and non-adjacent parking locations;

enabling operation of a portable parking occupancy detection unit at the first street location and, for a period of time, recording video of the one or more parking spaces at the first street location with a closed circuit recording system associated with the portable parking occupancy detection unit;

stabilizing images in said recorded video of the one or more parking spaces with an image stabilization module associated with the portable occupancy detection unit;

identifying parking occupancy data for said period of time associated with the first street location;

identifying a second street location among said plurality of street locations where real-time parking occupancy data is not available, the second street location including one or more parking spaces and at least one parking meter enabled to record financial transactions associated with parking at the second street location, wherein said plurality of street locations includes adjacent and non-adjacent parking locations;

enabling operation of the portable parking occupancy detection unit at the second street location and, for a second period of time, recording video of the one or more parking spaces at the second street location;

stabilizing images in said recorded video of the one or more parking spaces at the second street location with an image stabilization module;

identifying parking occupancy data for said second period of time associated with the second street location;

obtaining parking meter transaction data corresponding to each parking meter at the first and second street locations;

correlating the parking occupancy data and the parking meter transaction data for each respective street location among said plurality of parking locations;

establishing a parking occupancy pattern over at least a week according to said correlation of the parking occupancy data and the parking meter transaction data; and in response to a request for parking occupancy information for at least one of the first street location and the second street location, providing an indication of a parking space status and a parking violation status.

9. The system of claim 8 wherein said portable parking occupancy detection unit at said first street location and/or said second street location comprises:
- a telescopic mast, said telescopic mast extending at least 20 feet and configured to be foldable;
- at least one camera associated with said closed circuit recording system for acquiring said video, said at least one camera located on said telescopic mast;
- a stabilization base for said telescopic mast, said stabilization base comprising a plurality of stabilization components that assist in stabilizing said telescopic mast, said stabilization components comprising a plurality of crossing base components anchored to the ground and a set of guy ropes;
- a power generating device that generates power and is configured on said plurality of stabilization components thereby supporting said telescopic mast;
- a video capturing/processing unit for said recording of said video acquired by said at least one camera; and
- a wireless communications unit for transmitting processed said parking occupancy data to a central location, said wireless communications unit associated with said video capturing/processing unit.

10. The system of claim 9 wherein said parking occupancy detection unit determines a number of parking vehicles and a number of available parking spaces of said street block at a given time, said street block including the first street location and the second street location, said plurality of parking locations including said adjacent and non-adjacent parking locations.

11. The system of claim 10 wherein said correlating the parking occupancy data and the parking meter transaction data further comprises deriving data indicative of monthly parking trends, in response to said correlating said parking occupancy data and said parking meter transaction data.

12. The system of claim 11 wherein said video capturing/processing unit communicates with said at least one camera in capturing and recording said video acquired by said at least one camera for offline processing and on-site processing.

13. The system of claim 10 wherein said correlating the parking occupancy data and the parking meter transaction data for each respective street location, further comprises correlating the parking occupancy data and the parking meter transaction data for each respective street location among said plurality of parking locations to derive data indicative of hourly, daily, weekly, and monthly parking trends and wherein said parking trends are confirmed on a regular basis so that parking occupancy predictions are modified of light seasonality, policy modifications and modifications to demand including demand generators and modifications to supply.

14. The system of claim 13 wherein said power generating device comprises a power unit comprising a set of batteries powered by at least one solar panel.

15. A non-transitory processor-readable medium storing code representing instructions to cause a process for street location parking prediction, said code comprising code to:
- identify a first street location among a plurality of street locations where real-time parking occupancy data is not available, the first street location including one or more parking spaces and at least one parking meter enabled to record financial transactions associated with parking at the first street location, wherein said plurality of street locations includes adjacent and non-adjacent parking locations;
- enable operation of a portable parking occupancy detection unit at the first street location and, for a period of time, recording video of the one or more parking spaces at the first street location with a closed circuit recording system associated with the portable parking occupancy detection unit;
- stabilize images in said recorded video of the one or more parking spaces with an image stabilization module associated with the portable occupancy detection unit;
- identify parking occupancy data for said period of time associated with the first street location;
- identify a second street location among said plurality of street locations where real-time parking occupancy data is not available, the second street location including one or more parking spaces and at least one parking meter enabled to record financial transactions associated with parking at the second street location, said plurality of street locations including said adjacent and non-adjacent parking locations;
- enable operation of the portable parking occupancy detection unit at the second street location and, for a second period of time, recording video of the one or more parking spaces at the second street location;
- stabilize images in said recorded video of the one or more parking spaces at the second street location with an image stabilization module;
- identify parking occupancy data for said second period of time associated with the second street location;
- obtain parking meter transaction data corresponding to each parking meter at the first and second street locations;
- correlate the parking occupancy data and the parking meter transaction data for each respective street location among said plurality of parking locations;
- establish a parking occupancy pattern over at least a week according to said correlation of the parking occupancy data and the parking meter transaction data; and
- in response to a request for parking occupancy information for at least one of the first street location and the second street location, provide an indication of a parking space status and a parking violation status.

16. The non-transitory processor-readable medium of claim 15 wherein said portable parking occupancy detection unit at said first street location and/or said second street location comprises:
- a telescopic mast, said telescopic mast extending at least 20 feet and configured to be foldable;
- at least one camera associated with said closed circuit recording system for acquiring said video, said at least one camera located on said telescopic mast;
- a stabilization base for said telescopic mast, said stabilization base comprising a plurality of stabilization components that assist in stabilizing said telescopic mast, said stabilization components comprising a plurality of crossing base components anchored to the ground, and a set of guy ropes;
- a power generating device that generates power and is configured on said plurality of stabilization components thereby supporting said telescopic mast;
- a video capturing/processing unit for said recording of said video acquired by said at least one camera; and
- a wireless communications unit for transmitting processed said parking occupancy data to a central location, said wireless communications unit associated with said video capturing/processing unit.

17. The non-transitory processor-readable medium of claim 16 wherein said parking occupancy detection unit determines a number of parking vehicles and a number of available parking spaces of said street block at a given time, said street block including the first street location and the second street location among said plurality of parking locations, said plurality of parking locations including said adjacent and non-adjacent parking locations.

18. The non-transitory processor-readable medium of claim 16 wherein said code to correlate the parking occupancy data and the parking meter transaction data further comprises code to correlate the parking occupancy data and the parking meter transaction data to derive data indicative of hourly, daily, weekly, and monthly parking trends, response to said correlating said parking occupancy data and said parking meter transaction data and wherein said parking trends are confirmed on a regular basis so that parking occupancy predictions are modified of light seasonality, policy modifications and modifications to demand including demand generators and modifications to supply.

19. The non-transitory processor-readable medium of claim 18 wherein said video capturing/processing unit communicates with said at least one camera in capturing and recording said video acquired by said at least one camera for offline processing and on-site processing.

20. The non-transitory processor-readable medium of claim 19 wherein said power generating device comprises a power unit comprising a set of batteries powered by at least one solar panel.

* * * * *